(12) United States Patent
Shimohata

(10) Patent No.: US 12,154,199 B2
(45) Date of Patent: Nov. 26, 2024

(54) CONTROL METHOD FOR DISPLAY SYSTEM WITH COMPOSITE IMAGE FORMATION

(71) Applicant: SEIKO EPSON CORPORATION, Tokyo (JP)

(72) Inventor: Hiroya Shimohata, Osaka (JP)

(73) Assignee: SEIKO EPSON CORPORATION, Tokyo (JP)

( * ) Notice: Subject to any disclaimer, the term of this patent is extended or adjusted under 35 U.S.C. 154(b) by 126 days.

(21) Appl. No.: 17/951,485

(22) Filed: Sep. 23, 2022

(65) Prior Publication Data

US 2023/0112393 A1 Apr. 13, 2023

(30) Foreign Application Priority Data

Sep. 24, 2021 (JP) .................................. 2021-155799

(51) Int. Cl.
*G06T 11/60* (2006.01)
*G06T 11/20* (2006.01)

(52) U.S. Cl.
CPC ............ *G06T 11/60* (2013.01); *G06T 11/203* (2013.01)

(58) Field of Classification Search
None
See application file for complete search history.

(56) References Cited

U.S. PATENT DOCUMENTS

| | | | |
|---|---|---|---|
| 2003/0058227 A1 | 3/2003 | Hara et al. | |
| 2015/0205444 A1* | 7/2015 | Galbraith | G06F 3/0416 345/175 |
| 2016/0018905 A1 | 1/2016 | Nagao | |
| 2016/0140745 A1* | 5/2016 | Natori | G06F 3/0416 345/629 |
| 2018/0074654 A1 | 3/2018 | Tanaka et al. | |

FOREIGN PATENT DOCUMENTS

| | | |
|---|---|---|
| JP | 2003-078686 A | 3/2003 |
| JP | 2013-175001 A | 9/2013 |
| JP | 2015-149648 A | 8/2015 |
| JP | 2016-021699 A | 2/2016 |
| JP | 2016-105264 A | 6/2016 |
| JP | 2016-186676 A | 10/2016 |
| JP | 2017-026677 A | 2/2017 |
| JP | 2018-010602 A | 1/2018 |

* cited by examiner

Primary Examiner — Jeffrey J Chow
(74) Attorney, Agent, or Firm — Dority & Manning, P.A.

(57) ABSTRACT

A control method for a display system includes, displaying, by an image supply device, a display image accepting a first operation to the display image transmitting a display signal to a display device, the display signal including coordinate information representing a position in the display image of the first operation and the display image generating, by the display device, a composite image formed by combining a line drawing image at a position corresponding to the coordinate information, and displaying, by the display device, the composite image on a display surface of the display device.

14 Claims, 7 Drawing Sheets

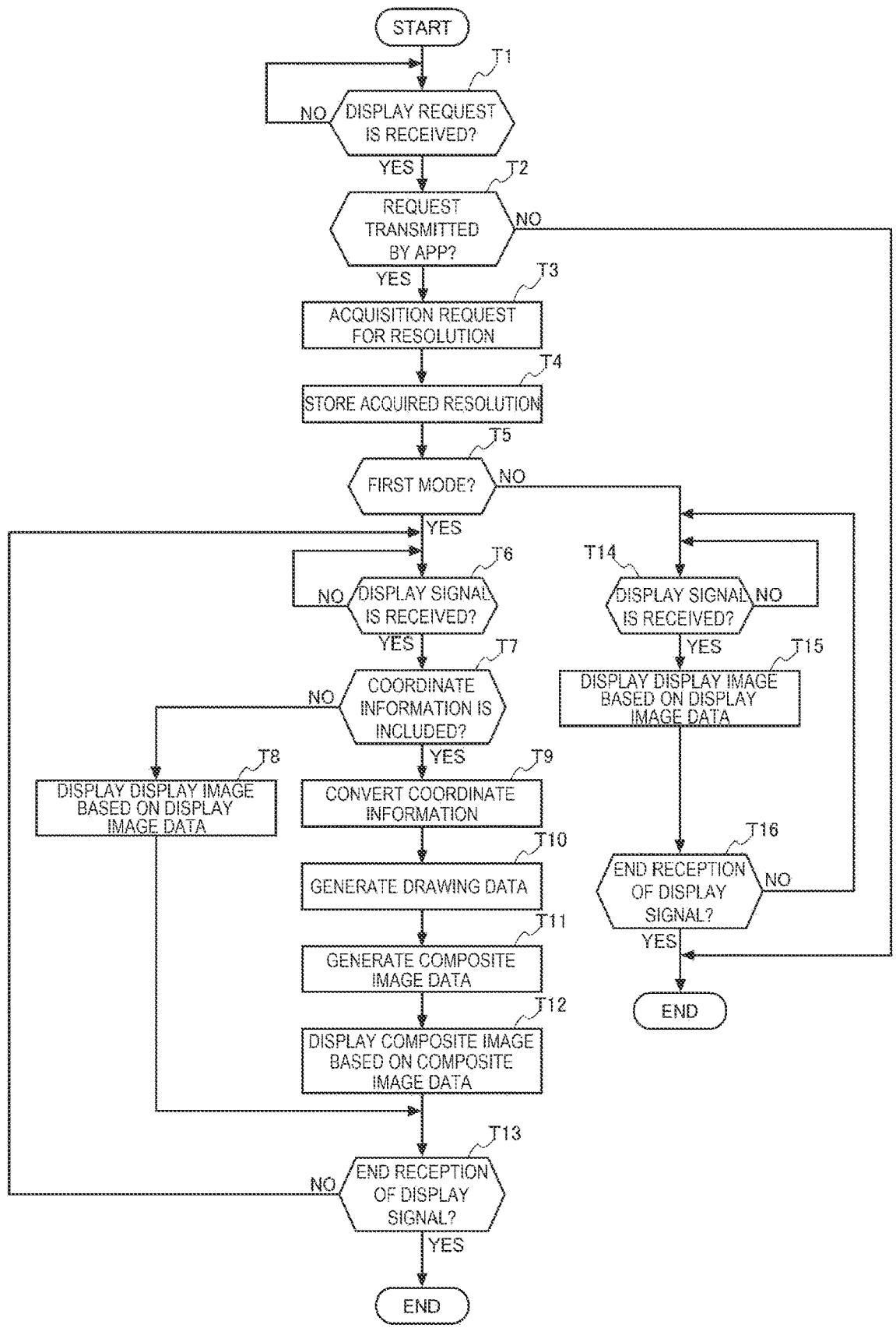

CONTROL METHOD FOR DISPLAY SYSTEM WITH COMPOSITE IMAGE FORMATION

The present application is based on, and claims priority from JP Application Serial Number 2021-155799, filed Sep. 24, 2021, the disclosure of which is hereby incorporated by reference herein in its entirety.

BACKGROUND

1. Technical Field

The present disclosure relates to a control method for a display system, and a display system.

2. Related Art

According to the related art, a system that has an image supply device and a display device displaying an image supplied from the image supply device, on a display surface, is known. In connection with this system, for example, a technique of displaying a line drawing image of a character, a symbol, a geometric shape or the like at a position on the display surface pointed by a pointer or outputting coordinate information representing the position on the display surface pointed by the pointer to the image supply device is known.

For example, the electronic blackboard system of JP-A-2003-78686 discloses an electronic blackboard that has a coordinate detection unit detecting a position on a screen operated by an electronic pen and a notification unit notifying a computer device of coordinate information on the screen detected by the coordinate detection unit.

However, a user located at a distance from the display surface needs to move to the position of the display surface and perform an operation with the pointer in order to display a line drawing image on the display surface. This poses a problem with the convenience of the user and there is room for improvement in operability.

SUMMARY

An aspect of the present disclosure is directed to a control method for a display system including: causing an image supply device to display a display image; accepting a first operation to the display image; transmitting a display signal to a display device, the display signal including coordinate information representing a position in the display image of the accepted first operation and the display image; causing the display device to generate a composite image formed by combining a line drawing image at a position corresponding to the received coordinate information; and displaying the generated composite image on a display surface of the display device.

Another aspect of the present disclosure is directed to a display system including an image supply device and a display device. The image supply device includes: a first communication unit; a display unit displaying a display image; an acceptance unit accepting a first operation to the display image; and a first control unit transmitting a display signal to the display device, the display signal including coordinate information representing a position in the display image of the first operation accepted by the acceptance unit and the display image. The display device includes: a second communication unit; a display unit displaying an image on a display surface; and a second control unit generating a composite image formed by combining a line drawing image at a position corresponding to the coordinate information received by the second communication unit, and causing the display unit to display the generated composite image on the display surface.

BRIEF DESCRIPTION OF THE DRAWINGS

FIG. 7 is a flowchart showing an operation of the projector.

DESCRIPTION OF EXEMPLARY EMBODIMENTS

1. Configuration of Display System

An embodiment of the present disclosure will now be described with reference to the accompanying drawings.

Figure 1:
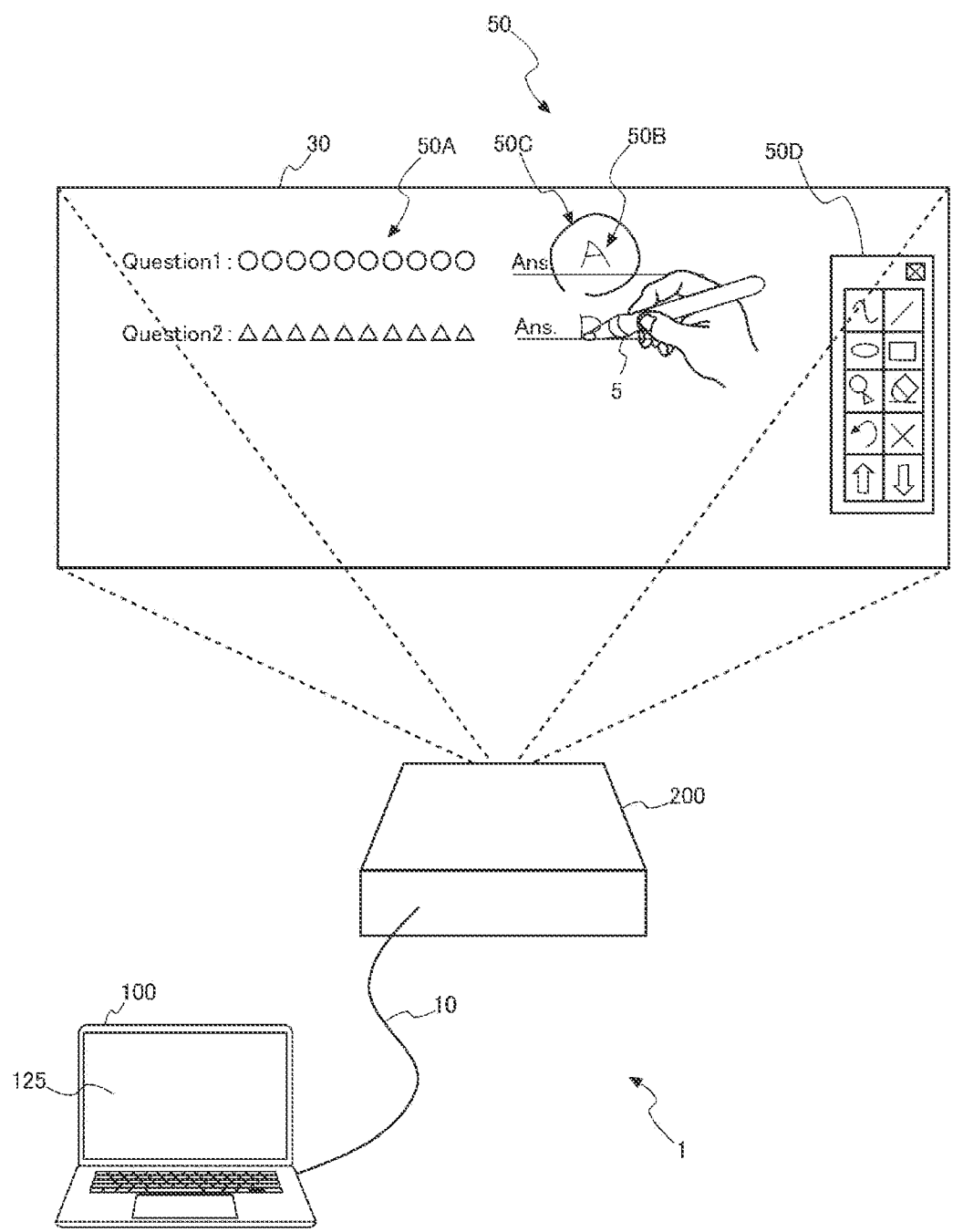
FIG. 1 shows the configuration of a display system.

FIG. 1 shows the configuration of a display system 1.

The display system 1 has an information processing device 100 operating as an image supply device and a projector 200 operating as a display device. The information processing device 100 and the projector 200 are coupled to each other via a cable 10. FIG. 1 shows a configuration where the information processing device 100 and the projector 200 are coupled to each other via the cable 10. However, the information processing device 100 and the projector 200 may be wirelessly connected to each other.

The information processing device 100 supplies the projector 200 with a signal including display image data to be displayed by the projector 200. The signal including the display image data transmitted from the information processing device 100 to the projector 200 is hereinafter referred to as a display signal. As the information processing device 100, for example, a personal computer such as a desktop personal computer or a laptop personal computer, or a portable terminal such as a smartphone or a tablet personal computer is used.

The display image data is data that is the source of a display image displayed on a display unit 120 of the information processing device 100 or data formed by capturing the display image. The display image data includes a file and image data or the like generated by an application program installed in the information processing device 100. The file and the image data may be a file and image data stored in advance in a storage unit provided in the information processing device 100. The file includes, for example, a file prepared by an application such as word processing software or spreadsheet software, or a document file such as a file saved in the PDF (Portable Document Format) format. The image data includes still image data and dynamic image data.

The information processing device 100 also transmits, to the projector 200, a display signal including coordinate information representing the coordinates of an operation inputted via an input device provided in the information processing device 100 in addition to the display image data. The coordinate information represents, for example, the coordinates of an operation inputted via the input device by a user viewing a display image displayed on the display unit 120 of the information processing device 100 or a display image displayed by the projector 200. More specifically, the coordinate information is information representing the display position of a cursor as of accepting an input by the input device. When the display unit 120 of the information processing device 100 has a touch panel 125, the coordinate information is information representing the position on the touch panel 125 touched by a touch operation.

The projector 200 displays, on a projection surface 30, a display image based on the display image data included in the display signal received from the information processing device 100. The projection surface 30 is equivalent to a display surface. When the display signal received from the information processing device 100 includes coordinate information, the projector 200 generates drawing data, which is data of a line drawing image, based on the received coordinate information, then combines the generated drawing data with the display image data, and thus generates composite image data. The projector 200 displays a composite image 50, which is an image based on the generated composite image data, on the projection surface 30.

The projector 200 detects an operation of an electronic pen 5 to the projection surface 30 and displays a line drawing image at the position on the projection surface 30 where the operation is detected. The electronic pen 5 has a light-emitting unit emitting infrared light and a press detection unit detecting a press on the projection surface 30 with the tip of the electronic pen 5, that is, a touch on the projection surface 30. As the press detection unit, for example, a pressure-sensitive switch can be used. The illustration of the light-emitting unit and the press detection unit is omitted. The light-emitting unit repeats flashing on and off in a predetermined sequence while the electronic pen 5 is operating. The light-emitting unit changes the light emission sequence according to whether there is a touch on the projection surface 30 or not. Therefore, the projector 200 can identify whether there is a touch by the electronic pen 5 or not, based on the light emission sequence of the light-emitting unit.

The projector 200 has an image capture unit 260 whose angle of view is adjusted in such a way as to be able to capture an image of at least a part of the projection surface 30. The projector 200 detects light emitted from the electronic pen 5 in an image captured by the image capture unit 260 and detects the position of the detected light as a pointed position pointed by the electronic pen 5. The projector 200 also detects whether there is a touch on the projection surface 30 or not, based on the light emission sequence of the detected light. The projector 200 generates drawing data, which is data of a line drawing image corresponding to the trajectory of the detected pointed position, and displays the generated drawing data on the projection surface 30.

FIG. 1 shows an example of the composite image 50 displayed on the projection surface 30 by the projector 200.

The composite image 50 includes a display image 50A of a file and image data or the like displayed on the touch panel 125 of the information processing device 100. FIG. 1 shows an example where a document file describing a question sentence is displayed as an example of the display image 50A.

The composite image 50 also includes a line drawing image 50B generated by the projector 200 along the trajectory of the position on the projection surface 30 pointed by the electronic pen 5. FIG. 1 shows an example where an answer "A" inputted by a student operating the electronic pen 5 is displayed as an example of the line drawing image 50B.

The composite image 50 also includes a line drawing image 50C generated by the projector 200, based on the coordinate information received from the information processing device 100. FIG. 1 shows an example where a circular geometric shape indicating a right answer inputted by a teacher operating the information processing device 100 is displayed as an example of the line drawing image 50C.

The composite image 50 also includes an OSD image 50D, which is an OSD (on-screen display) menu image.

2. Configuration of Information Processing Device

Figure 2:
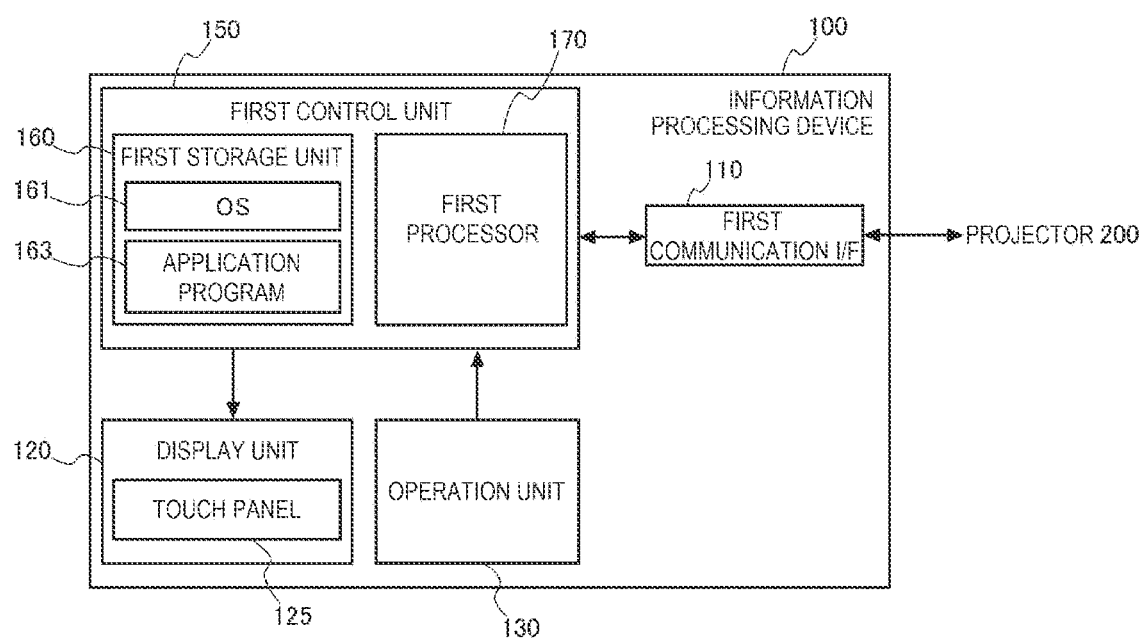
FIG. 2 is a block diagram showing the configuration of an information processing device.

FIG. 2 is a block diagram showing the configuration of the information processing device 100. The configuration of the information processing device 100 will now be described with reference to FIG. 2.

The information processing device 100 has a first communication interface 110, a display unit 120, an operation unit 130, and a first control unit 150. The interface is hereinafter abbreviated as I/F.

The first communication I/F 110 communicates data with the projector 200 via the cable 10. The first communication I/F 110 is, for example, a wired interface having a connection terminal such as a USB (Universal Serial Bus) connector or an Ethernet connector, and an interface circuit. The first communication I/F 110 may be a wireless communication interface. Ethernet is a registered trademark.

The display unit 120 has a touch panel 125 including a display panel and a touch sensor.

As the display panel, for example, a liquid crystal panel or an organic EL (electroluminescence) panel is used. The touch sensor is arranged as superimposed on the display panel and detects a touch operation on the touch panel 125. The touch sensor detects a position on the touch panel 125 touched by a pointer such as an electronic pen or by a user's finger, as a touch operation. The touch sensor outputs an operation signal including coordinate information representing the detected position on the touch panel 125 to the first control unit 150. By having the input of the operation signal from the touch panel 125, the first control unit 150 determines that the operation is accepted.

The operation unit 130 has an input device such as a mouse or a keyboard and accepts an operation by the user. The operation unit 130 outputs an operation signal corresponding to the accepted operation to the first control unit 150. By having the input of the operation signal from the operation unit 130, the first control unit 150 determines that the operation is accepted.

The first control unit 150 has a first storage unit 160 and a first processor 170.

The first storage unit 160 has a volatile memory such as a RAM (random-access memory) and a non-volatile memory such as a ROM (read-only memory). The first storage unit 160 also has an auxiliary storage device such as an SSD (solid-state drive) or an HDD (hard disk drive).

The first storage unit 160 stores an OS (operating system) 161 and a control program such as an application program 163 that are executed by the first processor 170. The application program 163 is hereinafter referred to as the app 163.

The first processor 170 is an arithmetic processing device formed by a CPU (central processing unit) or an MPU (micro-processing unit). The first processor 170 executes the OS 161 and the app 163 and thus controls each part of the information processing device 100.

Figure 3:
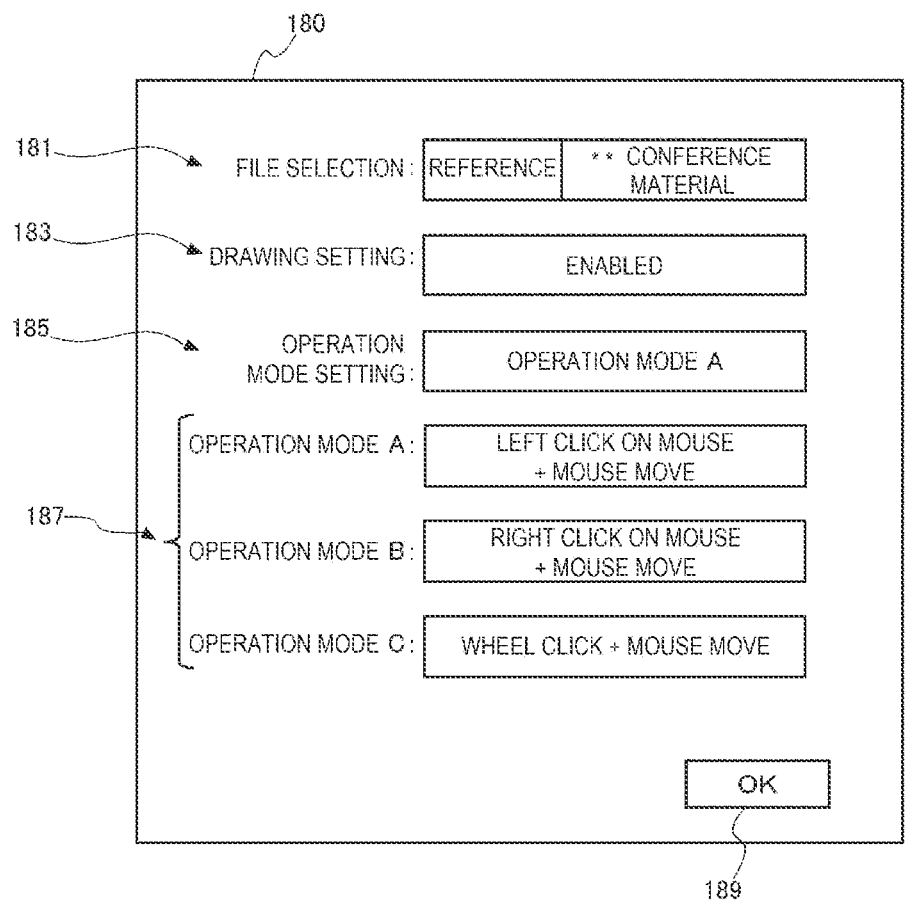
FIG. 3 shows an example of an app screen.

FIG. 3 shows an example of an app screen 180.

On accepting an operation to select an app 163 via the touch panel 125 or the operation unit 130, the first control unit 150 starts the selected app 163. The first control unit 150 executing the app 163 displays the app screen 180 on the touch panel 125.

On the app screen 180, various setting items such as a file selection 181, a drawing setting 183, and an operation mode setting 185 are displayed. On the app screen 180, an operation setting 187 and an OK button 189 are displayed as well.

The file selection 181 is an item for selecting a display image to be displayed by the display unit 120 and the projector 200. The user presses a reference button and selects a file stored in a folder in a file system managed by the OS 161 of the information processing device 100, as the display image.

As the file is selected via the file selection 181, the first control unit 150 displays an image of the selected file as the display image on the touch panel 125. The first control unit 150 captures the display image displayed on the touch panel 125 and generates display image data. The first control unit 150 may also use the file or image data itself that is the source of the display image, as the display image data. The first control unit 150 transmits a display signal including the generated display image data to the projector 200.

The drawing setting 183 is an item for enabling or disabling a drawing function. The drawing setting 183 is equivalent to a transmission setting about whether to transmit coordinate information to the projector 200 or not. The drawing function is the function of transmitting, to the projector 200, coordinate information representing the position on the touch panel 125 of a cursor as of accepting an operation via the operation unit 130 or the touch panel 125, and causing the projector 200 to display the line drawing image 50B corresponding to the coordinate information, on the projection surface 30. When the drawing setting 183 is set as enabled, the first control unit 150 transmits, to the projector 200, a display signal including coordinate information representing the position of the cursor on the touch panel 125 as of accepting an operation via the touch panel 125 or the operation unit 130. When the drawing setting 183 is set as disabled, the first control unit 150 does not transmit, to the projector 200, coordinate information accepted in response to an operation even if the operation is accepted via the touch panel 125.

The operation mode setting 185 is a setting item for setting an operation of the mouse, the keyboard, and the touch panel 125 transmitted as coordinate information when the drawing setting 183 is set as enabled. The operation mode setting 185 enables the user to select one of an operation mode A, an operation mode B, and an operation mode C. The operation mode A is equivalent to a third mode. The operation mode B or the operation mode C is equivalent to a fourth mode. The operation mode B may also be equivalent to the third mode. In this case, the operation mode A or the operation mode C is equivalent to the fourth mode. The operation mode C may also be equivalent to the third mode. In this case, the operation mode A or the operation mode B is equivalent to the fourth mode.

In the field of the operation mode setting 185, the one operation mode selected by the user from among the operation mode A, the operation mode B, and the operation mode C is displayed. When the first control unit 150 has accepted an operation corresponding to the operation mode selected via the operation mode setting 185, the first control unit 150 transmits the coordinate information of the accepted operation to the projector 200.

The app screen 180 also includes the operation setting 187 setting an operation in each operation mode. The operation setting 187 is a setting for prescribing an operation in each operation mode. The operation setting 187 for each of the operation mode A, the operation mode B, and the operation mode C can be changed by a user's operation.

For example, the app screen 180 shown in FIG. 3 shows an example where a press on the left button of the mouse, that is, a left click, and a movement of the mouse, are set as the operation mode A. When the operation mode A is equivalent to the third mode, a press on the left button of the mouse is equivalent to a second operation, and a movement of the mouse is equivalent to a first operation. When the operation mode A is equivalent to the fourth mode, a press on the left button of the mouse is equivalent to the third operation, and a movement of the mouse is equivalent to the first operation.

The app screen 180 also shows an example where a press on the right button of the mouse, that is, a right click, and a movement of the mouse, are set as the operation mode B. When the operation mode B is equivalent to the third mode, a press on the right button of the mouse is equivalent to the second operation, and a movement of the mouse is equivalent to the first operation. When the operation mode B is equivalent to the fourth mode, a press on the right button of the mouse is equivalent to the third operation, and a movement of the mouse is equivalent to the first operation.

The app screen 180 also shows an example where a press on the mouse wheel, that is, a wheel click, and a movement of the mouse, are set as the operation mode C. When the operation mode C is equivalent to the third mode, a press on the mouse wheel is equivalent to the second operation, and a movement of the mouse is equivalent to the first operation. When the operation mode C is equivalent to the fourth mode, a press on the mouse wheel is equivalent to the third operation, and a movement of the mouse is equivalent to the first operation.

The user sets each setting item of the file selection 181, the drawing setting 183, and the operation mode setting 185, and subsequently presses the OK button 189. In response to the press on the OK button 189, the first control unit 150 determines that the settings on the app screen 180 are enabled.

When the drawing setting 183 is set as enabled and an operation set by the operation mode setting 185 is accepted via the operation unit 130 or the touch panel 125, the first control unit 150 generates a display signal including coordinate information representing the position of the accepted operation and display image data. The first control unit 150 transmits the generated display signal to the projector 200. By having the input of an operation signal corresponding to the operation set by the operation mode setting 185 from the operation unit 130 or the touch panel 125, the first control unit 150 determines that the operation to the display image is accepted.

When the drawing setting 183 is set as disabled, the first control unit 150 does not transmit a display signal including coordinate information to the projector 200 even if an operation set by the operation mode setting 185 is detected. The first control unit 150 transmits a display signal that does not include coordinate information but includes display image data, to the projector 200.

3. Configuration of Projector

Figure 4:
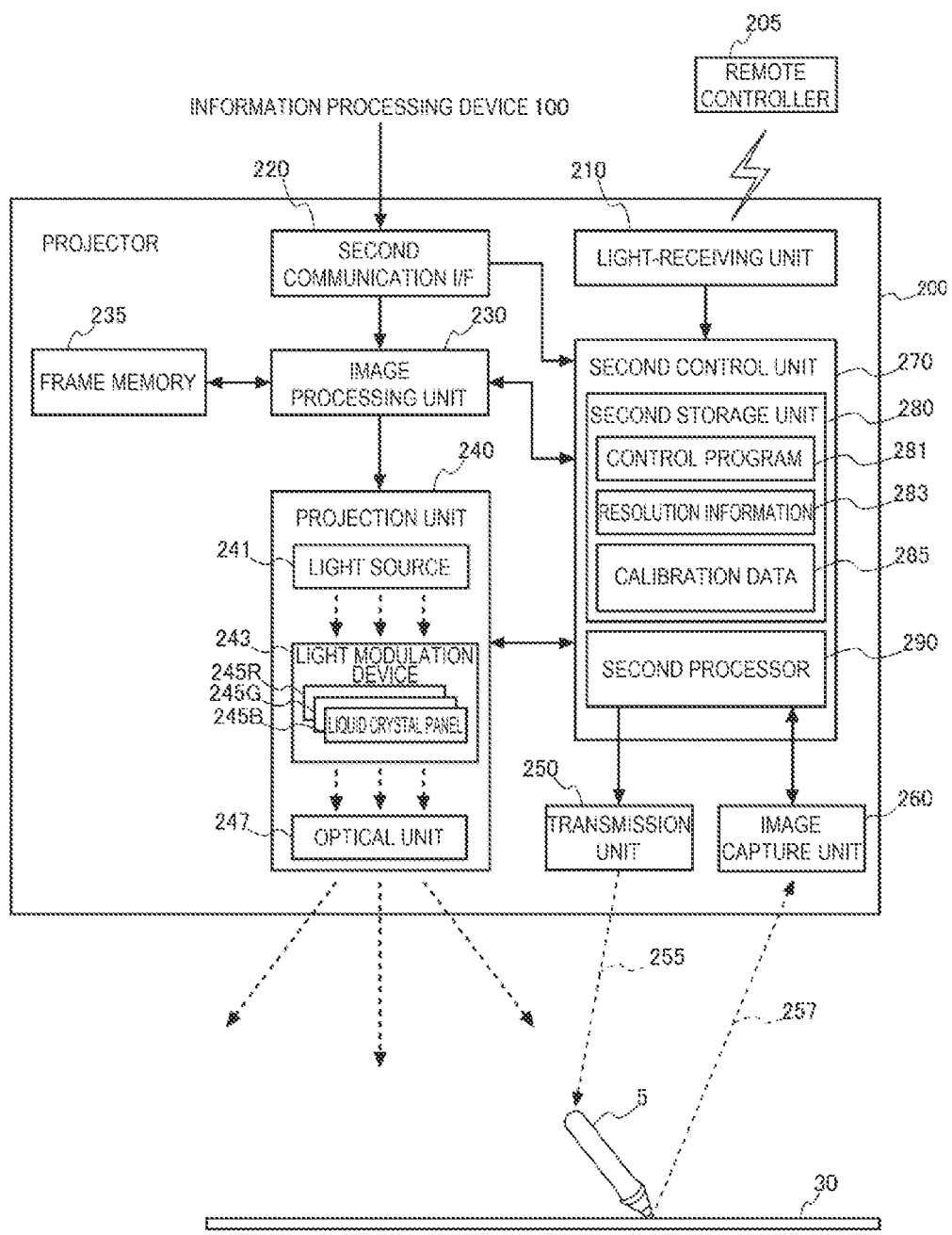
FIG. 4 is a block diagram showing the configuration of a projector.

FIG. 4 is a block diagram showing the configuration of the projector 200.

The configuration of the projector 200 will now be described with reference to FIG. 4.

The projector 200 has a light-receiving unit 210, a second communication I/F 220, an image processing unit 230, a frame memory 235, a projection unit 240, a transmission unit 250, an image capture unit 260, and a second control unit 270.

The light-receiving unit 210 receives an infrared signal transmitted from a remote controller 205. The light-receiving unit 210 outputs an operation signal corresponding to the received infrared signal, to the second control unit 270. The operation signal is a signal corresponding to the operated switch on the remote controller 205.

The second communication I/F 220 is coupled to the information processing device 100 via the cable 10. The second communication I/F 220 communicates data with the information processing device 100 via the cable 10. The second communication I/F 220 is, for example, a wired interface having a connection terminal such as a USB connector or an Ethernet connector, and an interface circuit. The second communication I/F 220 may be a wireless communication interface.

The second communication I/F 220 receives a display signal transmitted from the information processing device 100. The second communication I/F 220 extracts display image data, a synchronization signal, and coordinate information included in the received display signal. The second communication I/F 220 outputs the display image data and the synchronization signal that are extracted, to the image processing unit 230. The second communication I/F 220 also outputs the synchronization signal and the coordinate information that are extracted, to the second control unit 270.

The frame memory 235 is coupled to the image processing unit 230. The frame memory 235 has a plurality of banks. Each bank has a storage capacity that enables writing of display image data corresponding to one frame. The frame memory 235 is formed, for example, by an SDRAM (synchronous dynamic RAM). The image processing unit 230 loads the display image data inputted from the second communication I/F 220 into the frame memory 235.

The image processing unit 230 processes the display image data loaded in the frame memory 235, synchronously with the synchronization signal inputted from the second communication I/F 220.

The image processing performed by the image processing unit 230 includes, for example, resolution conversion processing or resizing processing, distortion correction, shape correction processing, digital zoom processing, adjustment of the color tone and luminance of the image, or the like. The image processing unit 230 executes processing designated by the second control unit 270 and performs processing using a parameter inputted from the second control unit 270 according to need. The image processing unit 230 can also execute a combination of a plurality of types of image processing, of the above image processing.

Also, drawing data and coordinate information are inputted to the image processing unit 230 from the second control unit 270. The drawing data is data generated by the second control unit 270, based on the coordinate information included in the display signal. The image processing unit 230 loads the inputted drawing data at the coordinates in the frame memory 235 represented by the coordinate information. Thus, composite image data formed by the display image data and the drawing data combined together is generated in the frame memory 235. The image processing unit 230 reads out the composite image data from the frame memory 235 and outputs the read-out composite image data to the projection unit 240.

The image processing unit 230 and the frame memory 235 are formed, for example, by an integrated circuit. The integrated circuit includes LSI (large-scale integration), ASIC (application-specific integrated circuit), PLD (programmable logic device), FPGA (field-programmable gate array), SoC (system-on-a-chip) or the like. A part of the configuration of the integrated circuit may include an analog circuit. A configuration where the second control unit 270 and the integrated circuit are combined together may be employed.

The projection unit 240 has a light source 241, a light modulation device 243, and an optical unit 247.

The light source 241 includes a discharge-type light source lamp such as an ultra-high-pressure mercury lamp or a metal halide lamp, or a solid-state light source such as a light-emitting diode or a semiconductor laser. The light emitted from the light source 241 is separated into color lights of red, green, and blue, by a color separation system, not illustrated.

The light modulation device 243 has three liquid crystal panels 245R, 245G, 245B corresponding to the color components of red, green, and blue. Hereinafter, the term "liquid crystal panel 245" is used when collectively referring to the liquid crystal panels 245R, 245G, 245B. The color lights of the color components of red, green, and blue separated by the color separation system enter the liquid crystal panels 245R, 245G, 245B, respectively.

Each of the liquid crystal panels 245R, 245G, 245B is formed by a transmission-type liquid crystal panel having a pair of transparent substrates with a liquid crystal enclosed between the substrates. In the liquid crystal panel, a pixel area formed by a plurality of pixels arranged in a matrix is formed and a drive voltage is applicable to the liquid crystal at each pixel.

The light modulation device 243 has a panel drive unit driving the liquid crystal panels 245R, 245G, 245B. The illustration of the panel drive unit is omitted. The panel drive unit applies a drive voltage corresponding to the inputted composite image data to each pixel in the pixel area and sets each pixel to a light transmittance corresponding to the composite image data. The light emitted from the light source 241 is transmitted through the pixel area in the liquid crystal panel and thus modulated, and forms image light corresponding to the composite image data for each color light. The resulting image lights of the respective colors are combined together for each pixel by a light combining system, not illustrated, and thus form image light representing a color image. The optical unit 247 has a projection lens and the like and projects the image light modulated by the liquid crystal panels, in an enlarged form on the projection surface 30. Thus, the composite image 50, which is an image based on the composite image data, is displayed on the projection surface 30.

The transmission unit 250 has, for example, a light source such as an LED, and a device controlling the turning on and off of the light source. The controlling device can be formed, for example, by an ASIC, FPGA or the like.

The transmission unit 250 outputs a first signal light 255, which is a signal for synchronizing the timing of light emission by the electronic pen 5 with the timing of image capture by the image capture unit 260. The first signal light 255 is a near-infrared signal receivable by the electronic pen 5. The transmission unit 250 periodically transmits the first signal light 255 while the projector 200 is active.

The first signal light 255 is a control signal indicating the timing for the electronic pen 5 to transmit a second signal light 257. The first signal light 255 is near-infrared light having a predetermined light emission pattern. The electronic pen 5 emits the second signal light 257, for example, synchronously with the timing of receiving the first signal light 255. The projector 200 causes the image capture unit 260 to execute image capture with the timing when the electronic pen 5 emits the second signal light 257.

The image capture unit 260 is a camera having an image capture element, not illustrated, such as a CCD (charge-coupled device) sensor or a CMOS (complementary metal-oxide semiconductor) sensor. The image capture unit 260 has an infrared transmission filter absorbing visible light and transmitting infrared light. The image capture unit 260 captures an image of the infrared light emitted from the electronic pen 5 via the infrared transmission filter. The image capture unit 260, under the control of the second control unit 270, repeatedly captures an image of the projection surface 30 and successively outputs a captured image, which is the result of image capture, to the second control unit 270.

The second control unit 270 is a computer device having a second storage unit 280 and a second processor 290.

The second storage unit 280 has a memory such as a RAM and a ROM. The RAM is used to temporarily store various data and the like. The ROM stores a control program for controlling operations of the projector 200 and various kinds of setting information or the like.

The second storage unit 280 stores a control program 281, resolution information 283, and calibration data 285. The second storage unit 280 also temporarily stores the captured image captured by the image capture unit 260 and the information about the resolution of the touch panel 125 acquired from the information processing device 100.

The control program 281 is a program such as firmware or an application program executed by the second processor 290.

The resolution information 283 is information about the resolution of the frame memory 235.

The calibration data 285 is data establishing the correspondence between coordinates on the captured image by the image capture unit 260 and coordinates on the frame memory 235. A two-dimensional coordinate system is set on the capture image and the frame memory 235. The calibration data 285 univocally specifies coordinates on the frame memory 235 corresponding to coordinates on the captured image.

The second processor 290 is an arithmetic processing device formed by a CPU or an MPU. The second processor 290 executes the control program 281 and thus controls each part of the projector 200. The second processor 290 may be formed by a single processor or may be formed by a plurality of processors. The second processor 290 may also be formed by an SoC integrated with a part or the entirety of the second storage unit 280 or another circuit. The second processor 290 may also be formed by a combination of a CPU executing a program and a DSP executing predetermined arithmetic processing. Moreover, all the functions of the second processor 290 may be installed in hardware or may be configured using a programmable device.

The second control unit 270 detects the infrared light emitted from the electronic pen 5 in the captured image inputted from the image capture unit 260. The second control unit 270 regards an image having a brightness equal to or higher than a predetermined threshold and a size within a predetermined range, of an image of infrared light included in the captured image, as the light emitted from the electronic pen 5. The second control unit 270 detects a pointed position pointed by the electronic pen 5, based on the position of the light emitted from the electronic pen 5 in the captured image. The second control unit 270 determines the light emission sequence of the electronic pen 5 and detects whether there is a touch on the projection surface 30 or not, based on the captured image acquired for a plurality of times.

The second control unit 270 generates drawing data of a line drawn along a trajectory of the pointed position, based on the result of the detection of the pointed position. For example, when the user performs a drawing operation to draw on the projection surface 30 with the electronic pen 5, that is, when the pointed position is changed in the state where the electronic pen 5 is contact with the projection surface 30, the second control unit 270 generates drawing data based on the trajectory of the pointed position.

When coordinate information and a synchronization signal are inputted from the second communication I/F 220 to the second control unit 270, the second control unit 270 generates drawing data based on the inputted coordinate information. This processing of generating the drawing data is performed synchronously with the synchronization signal.

The second control unit 270 acquires information about resolution from the second storage unit 280. The information about resolution to be acquired is information about the resolution of the frame memory 235 and information about the resolution of the touch panel 125 provided in the information processing device 100. For example, when the second control unit 270 has received a display request for a display image from the information processing device 100, the second control unit 270 transmits an acquisition request for the information about the resolution of the touch panel 125 to the information processing device 100. On receiving the information about the resolution of the touch panel 125 from the information processing device 100, the second control unit 270 stores the received information about the resolution in the second storage unit 280.

The second control unit 270 calculates the ratio between the resolution of the frame memory 235 and the resolution of the touch panel 125 in each of the vertical direction and the horizontal direction, based on the information about the resolution of the frame memory 235 and the information about the resolution of the touch panel 125 that are acquired. The calculated ratio of resolution in the vertical direction is referred to as a vertical resolution ratio. The calculated ratio of resolution in the horizontal direction is referred to as a horizontal resolution ratio.

When coordinate information is inputted to the second control unit 270 from the second communication I/F 220, the second control unit 270 converts the inputted coordinate information into coordinate information on the frame memory 235, based on the vertical resolution ratio and the horizontal resolution ratio. The second control unit 270 adds up the vertical resolution ratio to the coordinate in the vertical direction on the touch panel 125, which is the inputted coordinate information, and thus converts the coordinate information into coordinate information in the vertical direction on the frame memory 235.

Similarly, the second control unit 270 adds up the horizontal resolution ratio to the coordinate in the horizontal direction on the touch panel 125, which is the inputted coordinate information, and thus converts the coordinate information into coordinate information in the horizontal direction on the frame memory 235.

After converting the inputted coordinate information into the coordinate information on the frame memory 235, the second control unit 270 generates drawing data based on the converted coordinate information. After generating the drawing data, the second control unit 270 outputs the generated drawing data and the coordinate information on the frame memory 235 to the image processing unit 230.

The operation modes of the projector 200 will now be described.

The projector 200 has a first mode and a second mode as the operation modes.

The first mode is a mode where the projector 200 acquires display image data and coordinate information included in the display signal received from the information processing device 100 and generates composite image data based on the acquired display image data and coordinate information. That is, the first mode is a mode where the composite image 50 is displayed on the projection surface 30.

The second mode is a mode where a display image based on the display image data is displayed on the projection surface 30 without generating composite image data even when the display signal received from the information processing device 100 includes coordinate information.

Also, the second mode is a mode where the projector 200 transmits coordinate information representing the pointed position on the projection surface 30 pointed by the electronic pen 5 to the information processing device 100 and where the information processing device 100 executes processing based on the coordinate information received from the projector 200.

The operation mode can be changes between the first mode and the second mode by operating the remote controller 205. The user operates the remote controller 205 to set the operation mode of the projector 200 to the first mode or the second mode. When an operation signal corresponding to the operation on the remote controller 205 is inputted to the second control unit 270 from the light-receiving unit 210, the second control unit 270 changes the operation mode of the projector 200 to the first mode or the second mode, based on the inputted operation signal.

When the operation mode of the projector 200 is set to the first mode and coordinate information is inputted to the second control unit 270 from the second communication I/F 220, the second control unit 270 converts the inputted coordinate information into coordinate information on the liquid crystal panel 245 and generates drawing data based on the converted coordinate information. The second control unit 270 outputs the generated drawing data and the coordinate information to the image processing unit 230 and causes the image processing unit 230 to combine the display image data and the drawing data together to generate composite image data.

When the operation mode of the projector 200 is set to the second mode, even if coordinate information is inputted to the second control unit 270 from the second communication I/F 220, the second control unit 270 destroys the inputted coordinate information and does not perform the processing of generating drawing data based on the coordinate information. Therefore, drawing data is not loaded in the frame memory 235 and composite image data is not generated, either. That is, only the display image data is drawn in the frame memory 235 and therefore a display image based on the display image data is displayed on the projection surface 30.

The second control unit 270 may also be configured to accept a display setting as to whether to display composite image data on the projection surface 30 or not, via the remote controller 205.

For example, when the operation mode of the projector 200 is the second mode, operation information resulting from operating the electronic pen 5 may be erroneously transmitted to the information processing device 100 and thus erroneously operate the information processing device 100. Therefore, setting the operation mode of the projector 200 to the first mode can prevent the erroneous operation of the information processing device 100 due to the operation of the electronic pen 5. Also, after the operation mode of the projector 200 is set to the first mode, whether to display composite image data on the projection surface 30 or not is set by the display setting. Thus, even when the information processing device 100 is erroneously operated, the drawing line image 50B corresponding to the erroneous operation can be prevented from being displayed.

Even when the operation mode of the projector 200 is the second mode, if a pointed position on the projection surface 30 pointed by the electronic pen 5 is detected in the captured image by the image capture unit 260, the second control unit 270 generates drawing data based on the detected pointed position. The second control unit 270 outputs the generated drawing data and the coordinate information to the image processing unit 230 and thus causes the image processing unit 230 to combine the drawing data with the display image data.

4. Operation of Information Processing Device

Figure 5:
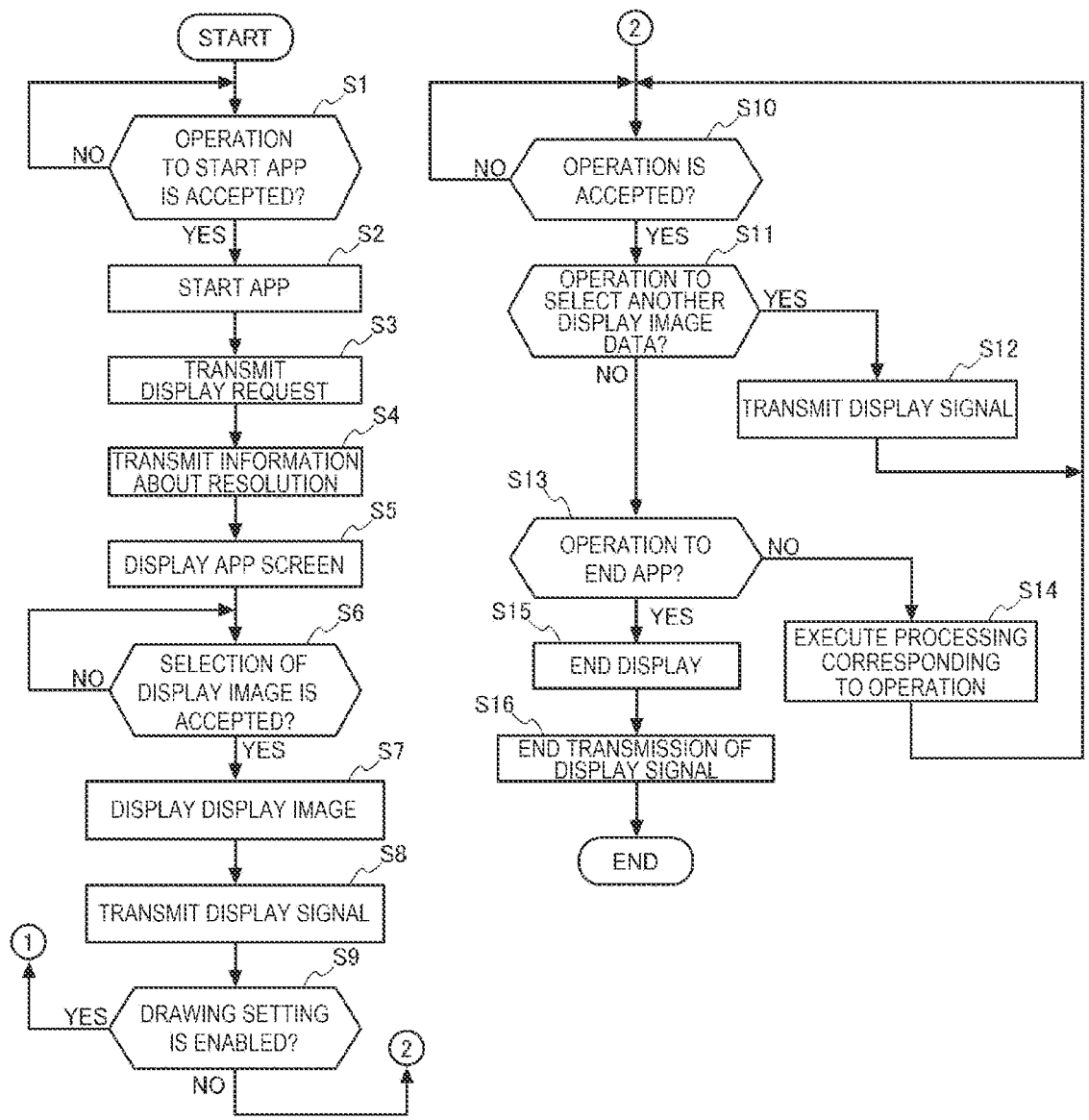
FIG. 5 is a flowchart showing an operation of the information processing device.
Figure 6:
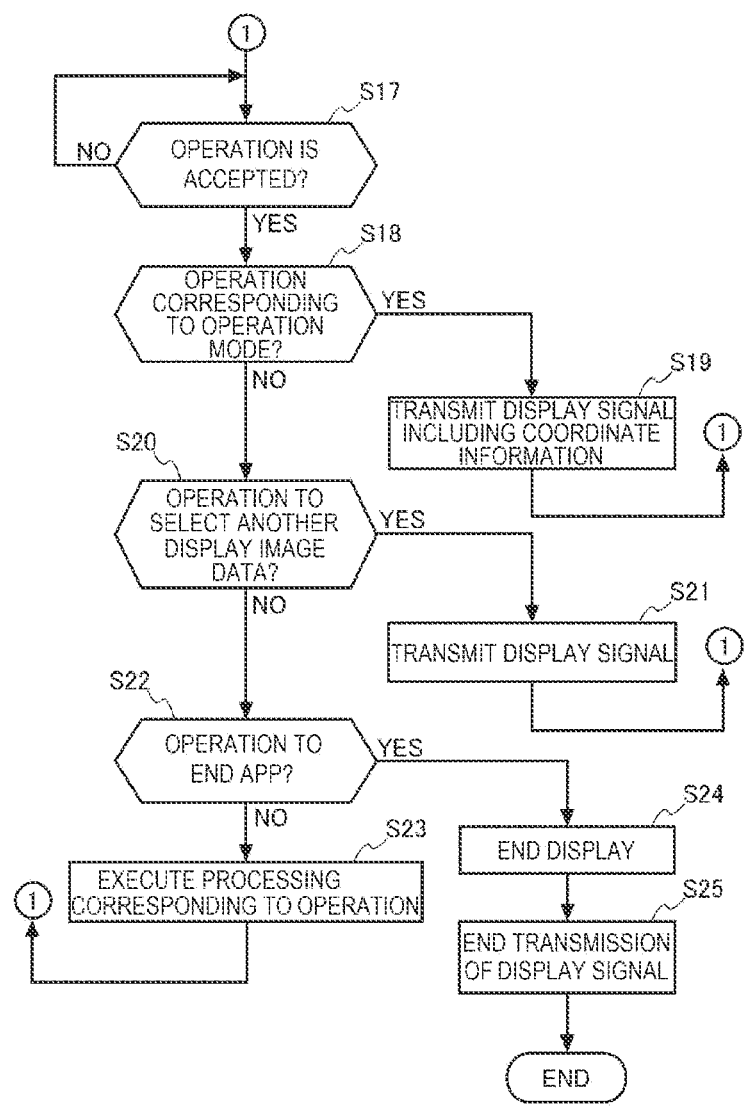
FIG. 6 is a flowchart showing an operation of the information processing device.

FIGS. 5 and 6 are flowcharts showing an operation of the information processing device 100.

The operation of the information processing device 100 will now be described with reference to the flowcharts shown in FIGS. 5 and 6.

First, the first control unit 150 determines whether an operation to start the app 163 is accepted via the operation unit 130 or the touch panel 125 or not (step S1). When an operation to start the app 163 is not accepted (NO in step S1), the first control unit 150 does not start processing until an operation to start the app 163 is accepted.

When an operation to start the app 163 is accepted (YES in step S1), the first control unit 150 executes and starts the selected app 163 (step S2) and transmits a display request for a display image to the connected projector 200 (step S3). The display request includes data indicating that this display request is transmitted from a device executing the app 163 provided from a preset source of provision. Next, the first control unit 150 transmits information about the resolution of the touch panel 125 to the projector 200 in response to a request from the projector 200 (step S4).

Next, the first control unit 150 causes the touch panel 125 to display the app screen 180 (step S5). The user sets each item of the file selection 181, the drawing setting 183, and the operation mode setting 185 or the like in the app screen 180 displayed on the touch panel 125. The first control unit 150 determines whether each setting item in the app screen 180 is set and whether the OK button 189 is pressed or not. The first control unit 150 determines whether the OK button 189 is pressed or not, and thus determines whether display image data is selected or not (step S6). The first control unit 150 waits to start processing until determining that the OK button 189 is pressed and that display image data is selected (NO in step S6).

When the first control unit 150 has determined that the OK button 189 is pressed and that display image data is selected (YES in step S6), the first control unit 150 causes the touch panel 125 to display a display image that is an image of the file selected via the file selection 181 (step S7). The first control unit 150 also generates a display signal including display image data that is data of the selected display image, and transmits the generated display signal to the projector 200 (step S8).

Next, the first control unit 150 determines whether the drawing setting 183 set in the app screen 180 is enabled or not (step S9). When the drawing setting 183 is not enabled (NO in step S9), the first control unit 150 determines whether an operation is accepted via the operation unit 130 or the touch panel 125 or not (step S10). When an operation is not accepted (NO in step S10), the first control unit 150 waits until an operation is accepted.

When an operation is accepted via the operation unit 130 or the touch panel 125 (YES in step S10), the first control unit 150 determines whether the accepted operation is an operation to select another display image data or not (step S11).

When the accepted operation is an operation to select another display image data (YES in step S11), the first control unit 150 generates a display signal including the selected display image data and transmits the generated display signal to the projector 200 (step S12). Subsequently, the first control unit 150 returns to the determination of step S10.

Meanwhile, when the accepted operation is not an operation to select another display image data (NO in step S11), the first control unit 150 determines whether the accepted operation is an operation to end the app 163 or not (step S13).

When the accepted operation is an operation to end the app (YES in step S13), the first control unit 150 ends the display of the display image displayed on the touch panel 125 (step S15). Subsequently, the first control unit 150 ends the transmission of the display signal to the projector 200 (step S16) and ends this processing flow.

Meanwhile, when the accepted operation is not an operation to end the app 163 (NO in step S13), the first control unit 150 executes processing corresponding to the accepted operation S14) (step and returns to the determination of step S10. When the accepted operation is an operation to change the drawing setting 183 to being enabled, the first control unit 150 may determine that the drawing setting 183 set in the app screen 180 is enabled, and may shift to step S17, described later.

The operation in the case where it is determined in the determination of step S9 that the drawing setting is enabled, will now be described with reference to the flowchart shown in FIG. 6.

When the first control unit 150 has determined in the determination of step S9 that the drawing setting is enabled (YES in step S9), the first control unit 150 determines whether n operation is accepted via the operation unit 130 or the touch panel 125 or not (step S17). When an operation is not accepted via the operation unit 130 or the touch panel 125 (NO in step S17), the first control unit 150 waits until an operation is accepted.

When an operation is accepted via the operation unit 130 or the touch panel 125 (YES in step S17), the first control unit 150 determines whether the accepted operation is an operation corresponding to the operation mode set in the app screen 180 or not (step S18). When the operation represented by the operation signal inputted from the operation unit 130 or the touch panel 125 is an operation corresponding to the operation mode (YES in step S18), the first control unit 150 generates a display signal including the coordinate information inputted by this operation and transmits the generated display signal to the projector 200 (step S19). Subsequently, the first control unit 150 returns to the determination of step S17.

When the accepted operation is not an operation corresponding to the operation mode (NO in step S18), the first control unit 150 determines whether the accepted operation is an operation to select another display image data or not (step S20).

When the accepted operation is an operation to select another image display data (YES in step S20), the first control unit 150 generates a display signal including another display image data that is selected, and transmits the generated display signal to the projector 200 (step S21). Subsequently, the first control unit 150 returns to the determination of step S17.

When the accepted operation is not an operation to select another display image data (NO in step S20), the first control unit 150 determines whether the accepted operation is an operation to end the app or not (step S22).

When the accepted operation is an operation to end the app 163 (YES in step S22), the first control unit 150 ends the display of the display image displayed on the touch panel 125 (step S24). Subsequently, the first control unit 150 ends the transmission of the display signal to the projector 200 (step S25) and ends this processing flow.

Meanwhile, when the accepted operation is not an operation to end the app 163 (NO in step S22), the first control unit 150 executes processing corresponding to the accepted operation (step S23) and returns to the determination of step S17.

5. Operation of Projector

FIG. 7 is a flowchart showing an operation of the projector 200.

The operation of the projector 200 will now be described with reference to the flowchart shown in FIG. 7.

The second control unit 270 determines whether a display request is received from the connected information processing device 100 or not (step T1). When a display request is not received (NO in step T1), the second control unit 270 waits until a display request is received.

When a display request is received (YES in step T1), the second control unit 270 determines whether the received display request is a request transmitted from a device executing the app 163 or not (step T2). The second control unit 270 determines whether the display request includes preset data or not, and thus determines whether the display request is a request transmitted from a device executing the app 163 or not.

When the display request is not a request transmitted from a device executing the app 163 (NO in step T2), the second control unit 270 ends this processing flow and executes normal processing of displaying an image received by the second communication I/F 220 on the projection surface 30.

When the display request is a request transmitted from a device executing the app 163 (YES in step T2), the second control unit 270 transmits an acquisition request for resolution to the device from which the display request is received (step T3). On receiving the acquisition request for resolution from the projector 200, the information processing device 100 transmits information about the resolution of the touch panel 125 to the projector 200. The second control unit 270 causes the second storage unit 280 to store the information about the resolution received from the information processing device 100 (step T4).

Next, the second control unit 270 determines whether the operation mode of the projector 200 is the first mode or not (step T5). When the operation mode is the first mode (YES in step T5), the second control unit 270 determines whether a display signal is received from the information processing device 100 or not (step T6). When a display signal is not received (NO in step T6), the second control unit 270 waits until a display signal is received.

When a display signal is received from the information processing device 100 (YES in step T6), the second control unit 270 determines whether the received display signal includes coordinate information or not (step T7). When the display signal does not include coordinate information (NO in step T7), the second control unit 270 causes the image processing unit 230 to process the display image data included in the display signal and causes the projection unit 240 to display a display image based on the processed display image data (step T8). Subsequently, the second control unit 270 shifts to the determination of step T13.

When the received display signal includes coordinate information (YES in step T7), the second control unit 270 converts the coordinate information into coordinate information on the frame memory 235, based on the ratio of resolution (step T9). Next, the second control unit 270 generates drawing data based on the converted coordinate information (step T10). The second control unit 270 outputs the generated drawing data and the coordinate information to the image processing unit 230 and causes the image processing unit 230 to combine the display image data and the drawing data together to generate composite image data (step T11). The second control unit 270 causes the projection unit 240 to display the composite image 50 based on the generated composite image data, on the projection surface 30 (step T12).

Next, the second control unit 270 determines whether the information processing device 100 has stopped transmitting a display signal, thus creating a state where a display signal cannot be received, or not (step T13). When in the state where a display signal cannot be received (YES in step T13), the second control unit 270 ends this processing flow. Meanwhile, when the reception of a display signal continues (NO in step T13), the second control unit 270 returns to step T6 and determines whether a display signal is received or not.

When having determined in step T5 that the operation mode is not the first mode (NO in step T5), the second control unit 270 determines whether a display signal is received or not (step T14). When a display signal is not received (NO in step T14), the second control unit 270 waits until a display signal is received.

When a display signal is received (YES in step T14), the second control unit 270 causes the image processing unit 230 to process the display image data included in the received display signal and causes the projection unit 240 to display a display image based on the processed display image data (step T15). Subsequently, the second control unit 270 shifts to the determination of step T16. Then, the second control unit 270 determines whether the information processing device 100 has stopped transmitting a display signal, thus creating a state where a display signal cannot be received, or not (step T16). When in the state where a display signal cannot be received (YES in step T16), the second control unit 270 ends this processing flow. Meanwhile, when the reception of a display signal continues (NO in step T16), the second control unit 270 returns to step T14 and determines whether a display signal is received or not.

6. Effects of Control Method for Display System

As described above, the display system 1 according to this embodiment is a system including the information processing device 100 operating as an image supply device and the projector 200 operating as a display device.

The first control unit 150 provided in the information processing device 100 executes causing the information processing device 100 to display a display image, and accepting a first operation to the display image. The first control unit 150 also executes transmitting a display signal to the projector 200, the display signal including coordinate information representing the position in the display image of the accepted first operation and the display image.

The second control unit 270 provided in the projector 200 executes generating the composite image 50 formed by combining the line drawing image 50B at the position corresponding to the coordinate information received by the projector 200, and displaying the generated composite image 50 on the projection surface 30 of the projector 200.

Thus, by operating the operation unit 130 or the touch panel 125 of the information processing device 100, the user can display the composite image 50 formed by combining the line drawing image 50B corresponding to this operation with the display image, on the projection surface 30. Therefore, the user can display the line drawing image 50B on the projection surface 30 without operating the projector 200. The convenience of the user can be improved.

When the operation mode of the projector 200 is the first mode, the second control unit 270 generates a composite image based on the display image and the coordinate information included in the received display signal and displays the generated composite image on the projection surface 30.

When the operation mode of the projector 200 is the second mode, the second control unit 270 acquires the display image included in the received display signal and displays the acquired display image on the projection surface 30.

Thus, by changing the operation mode of the projector 200, the user can set whether to display the composite image on the projection surface 30 or not. Therefore, the convenience of the user can be improved.

The second control unit 270 accepts a display setting indicating whether to display the composite image on the projection surface 30 or not. When the display setting indicates that the composite image is not to be displayed on the projection surface 30, the second control unit 270 does not display the composite image on the projection surface 30 even if the projector 200 is in the first mode.

Thus, by configuring the display setting so as not to display the composite image on the projection surface 30 even if the projector 200 is in the first mode, the user can prevent an operation accepted by the information processing device 100 from being displayed on the projection surface 30. Therefore, the convenience of the user can be improved further.

The first control unit 150 accepts a transmission setting indicating whether to transmit coordinate information to the projector 200 or not.

When the transmission setting indicates that coordinate information is to be transmitted to the projector 200, the first control unit 150 transmits a display signal including coordinate information to the projector 200. Meanwhile, when the transmission setting indicates that coordinate information is not to be transmitted to the projector 200, the first control unit 150 transmits a display signal that does not include coordinate information to the projector 200.

Thus, by changing the transmission setting of the information processing device 100, the user can set whether to transmit coordinate information corresponding to an operation accepted by the information processing device 100 to the projector 200 or not. Therefore, the convenience of the user can be improved.

When the first control unit 150 has accepted the first operation and a different operation from the first operation, the first control unit 150 transmits a display signal including coordinate information representing the position in the display image of the first operation, to the projector 200.

Thus, when a plurality of operations are detected, the first control unit 150 transmits coordinate information representing the position in the display image of the first operation to the projector 200. Therefore, an erroneous operation can be prevented from being transmitted to the projector 200 and the convenience of the user can be improved.

When the operation mode is the operation mode A and the first control unit 150 has accepted the first operation and a second operation, which is different from the first operation, the first control unit 150 transmits a display signal including coordinate information representing the position on the projection surface 30 of the first operation, to the projector 200.

Meanwhile, when the operation mode is the operation mode B and the first control unit 150 has accepted the first operation and a operation, which is different from the first operation and the second operation, the first control unit 150 transmits a display signal including coordinate information representing the position on the projection surface 30 of the first operation, to the projector 200.

Thus, the operation to transmit coordinate information to the projector 200 can be changed according to the operation mode.

7. Effects of Configuration of Display System

The display system 1 has the information processing device 100 and the projector 200.

The information processing device 100 has the first communication I/F 110 equivalent to a first communication unit, the touch panel 125 equivalent to a display unit, the touch panel 125 or the operation unit 130 equivalent to an acceptance unit, and the first control unit 150.

The first control unit 150 causes the touch panel 125 to display a display image.

The touch panel 125 or the operation unit 130 accepts a first operation to the display image.

The first control unit 150 transmits a display signal to the projector 200, the display signal including coordinate information representing the position in the display image of the first operation accepted by the touch panel 125 or the operation unit 130 and the display image.

The projector 200 has the second communication I/F 220 equivalent to a second communication unit, the projection unit 240 equivalent to a display unit, and the second control unit 270.

The projection unit 240 displays an image on the projection surface 30.

The second control unit 270 generates the composite image 50 formed by combining the line drawing image 50B at the position corresponding to the coordinate information received by the second communication I/F 220 and causes the projection unit 240 to display the generated composite image 50 on the projection surface 30.

Thus, by operating the operation unit 130 or the touch panel 125 of the information processing device 100, the user can display the composite image formed by combining the line drawing image corresponding to this operation with the display image, on the projection surface 30. Therefore, the user can display the line drawing image 50B on the projection surface 30 without operating the projector 200. The convenience of the user can be improved.

The foregoing embodiment is a preferred embodiment of the present disclosure. However, the present disclosure is not limited to the foregoing embodiment and can be implemented with various modifications without departing from the spirit and scope of the present disclosure.

For example, in the information processing device 100, an input of coordinate information may be accepted via an operation on the touch panel 125 with a user's finger or an electronic pen.

For example, in the case of inputting coordinate information via a user's finger, for example, the operation mode A can be set to all touch operations with the finger and the operation mode B can be set to a long-press operation of executing a long press on the surface of the touch panel 125 with the finger and a movement of the touch position after the detection of the long-press operation.

In the case of inputting coordinate information with an electronic pen, for example, the operation A can be set to all touch operations with the electronic pen and the operation B can be set to a press on a button provided at the lateral side of the electronic pen and a movement of the touch position of the electronic pen.

In the case of operating the operation unit 130 or the touch panel 125 of the information processing device 100 so as to display the line drawing image 50B on the projection surface 30, the thickness and type of the line of the line drawing image 50B can be changed by operating the OSD image 50D for changing the settings of the electronic pen 5.

That is, the second control unit 270 of the projector 200 generates drawing data corresponding to the thickness and type of the line set on the electronic pen 5, combines the generated drawing data with the display image data, and thus generates composite image data.

Each functional unit of the information processing device 100 shown in FIG. 2 represents a functional configuration and is not limited to any specific form of installation. That is, a piece of hardware corresponding individually to each functional unit need not necessarily be installed. A single processor may be configured to execute a program to implement functions of a plurality of functional units. A part of the functions implemented by software in the embodiment may be implemented by hardware. Also, a part of the functions implemented by hardware may be implemented by software. Moreover, the specific detailed configuration of each of the other parts of the information processing device 100 can be arbitrarily changed without departing from the spirit and scope of the present disclosure.

Each functional unit of the projector 200 shown in FIG. 4 represents a functional configuration and is not limited to any specific form of installation. That is, a piece of hardware corresponding individually to each functional unit need not necessarily be installed. A single processor may be configured to execute a program to implement functions of a plurality of functional units. A part of the functions implemented by software in the embodiment may be implemented by hardware. Also, a part of the functions implemented by hardware may be implemented by software. Moreover, the specific detailed configuration of each of the other parts of the projector can be arbitrarily changed without departing from the spirit and scope of the present disclosure.

The processing steps in the flowcharts shown in FIGS. 5 and 6 are provided by dividing the processing according to the main content of the processing in order to facilitate the understanding of the processing by the information processing device 100. Similarly, the processing steps in the flowchart shown in FIG. 7 are provided by dividing the processing according to the main content of the processing in order to facilitate the understanding of the processing by the projector 200. The way the processing is divided into processing steps and the names of the processing steps shown in the flowcharts of FIGS. 5, 6, and 7 do not limit the present disclosure. The processing by the first control unit 150 and the second control unit 270 can be divided into more processing steps according to the content of the processing. Also, the processing can be divided in such a way that one processing step includes more processing. The order of the processing steps in the flowcharts is not limited to the illustrated examples.

In the foregoing embodiment, the liquid crystal panel 245 provided in the light modulation device 243 may be a transmission-type liquid crystal panel or a reflection-type liquid crystal panel. The light modulation device 243 may also be configured having a digital mirror device or may be configured with a combination of a digital mirror device and a color wheel. The light modulation device 243 may also employ a configuration that can modulate light emitted from the light source, other than the liquid crystal panel and the DMD.

In the foregoing embodiment, the projector 200 is used as the display device. However, this is not limiting. For example, the display device may be a display such as a liquid crystal display, an organic EL display or a plasma display. When these displays are used, the transmission unit 250 and the image capture unit 260 described in the foregoing embodiment may be provided in the display so as to detect the position of the electronic pen 5. Alternatively, the display surface of the liquid crystal panel or the organic EL panel or the like may be configured as a touch panel including a display panel and a touch sensor so as to detect a touch position on the display surface.

In the foregoing embodiment, the display unit 120 has the touch panel 125 including a display panel and a touch sensor. However, this is not limiting. The display unit 120 may have at least a display panel.

In the case of implementing the control method for the display system by using the computer provided in the information processing device 100 and the computer provided in the projector 200, the programs executed by these computers can be configured in the form of a recording medium. Alternatively, the programs executed by these computers can be configured in the form of a transmission medium transmitting the programs. As the recording medium, a magnetic or optical recording medium or a semiconductor memory device can be used. Specifically, a portable recording medium such as a flexible disk, an HDD (hard disk drive), a CD-ROM, a DVD (digital versatile disc), a Blu-ray disc, a magneto-optical disc, a flash memory or a card-type recording medium, or a fixed recording medium may be employed. The recording medium may also be a non-volatile storage device such as a RAM, a ROM or an HDD that is an internal storage device provided in a server device. Blu-ray is a registered trademark.

What is claimed is:

1. A control method for a display system, the method comprising:
    displaying, by an image supply device, a display image;
    accepting a first operation to the display image;
    transmitting a display signal to a display device, the display signal including coordinate information representing a position in the display image of the first operation and the display image;
    generating, by the display device, a composite image formed by combining a line drawing image at a position corresponding to the coordinate information;
    displaying, by the display device, the composite image on a display surface of the display device;
    accepting, by the image supply device, a transmission setting indicating whether to transmit the coordinate information to the display device or not;
    transmitting, by the image supply device, the display signal including the coordinate information to the display device when the transmission setting indicates that the coordinate information is transmitted to the display device; and
    transmitting, by the image supply device, the display signal that does not include the coordinate information to the display device when the transmission setting indicates that the coordinate information is not transmitted to the display device.

2. The control method for the display system according to claim 1, further comprising:
    displaying, by the display device, the composite image generated based on the display image and the coordinate information included in the display signal, on the display surface, when an operation mode of the display device is a first mode, and
    displaying, by the display device, the display image included in the display signal on the display surface when the operation mode of the display device is a second mode.

3. The control method for the display system according to claim 2, further comprising:
    accepting, by the display device, a display setting indicating whether to display the composite image on the display surface or not, and
    not displaying the composite image, by the display device, on the display surface even if the display device is in the first mode, when the display setting indicates that the composite image is not to be displayed on the display surface.

4. The control method for the display system according to claim 1, further comprising:
    transmitting, by the image supply device, the display signal including the coordinate information representing the position in the display image of the first operation, to the display device, when the first operation and a different operation from the first operation are accepted.

5. The control method for the display system according to claim 4, further comprising:
    transmitting, by the image supply device, the display signal including the coordinate information representing a position on the display surface of the first operation, to the display device, when an operation mode of the image supply device is a third mode and the first operation and a second operation that is different from the first operation are accepted, and
    transmitting, by the image supply device, the display signal including the coordinate information representing the position on the display surface of the first operation, to the display device, when the operation mode of the image supply device is a fourth mode and the first operation and a third operation that is different from the first operation and the second operation are accepted.

6. The control method for the display system according to claim 4, further comprising:
    transmitting, by the image supply device, the display signal including the coordinate information representing a position on the display surface of the first operation, to the display device, when an operation mode of the image supply device is a third mode and the first operation and a second operation that is different from the first operation are accepted, and
    transmitting, by the image supply device, the display signal including the coordinate information representing the position on the display surface of the first operation, to the display device, when the operation mode of the image supply device is a fourth mode and the first operation and a third operation that is different from the first operation and the second operation are accepted.

7. The control method for the display system according to claim 1, further comprising:
transmitting, by the image supply device, the display signal including the coordinate information representing the position in the display image of the first operation, to the display device, when the first operation and a different operation from the first operation are accepted.

8. A display system comprising:
an image supply device including a first processor executing one or more programs for:
accepting a first operation to a display image; and
transmitting a display signal to a display device, the display signal including coordinate information representing a position in the display image of the first operation and the display image; and
the display device including a second processor executing one or more programs for:
generating a composite image formed by combining a line drawing image at a position corresponding to the coordinate information; and
displaying the composite image on a display surface;
wherein the first processor further executes one or more further programs for:
accepting, by the image supply device, a transmission setting indicating whether to transmit the coordinate information to the display device or not,
transmitting, by the image supply device, the display signal including the coordinate information to the display device when the transmission setting indicates that the coordinate information is transmitted to the display device, and
transmitting, by the image supply device, the display signal that does not include the coordinate information to the display device when the transmission setting indicates that the coordinate information is not transmitted to the display device.

9. The display system according to claim 8, wherein the second processor further executes one or more further programs for:
displaying, by the display device, the composite image generated based on the display image and the coordinate information included in the display signal, on the display surface, when an operation mode of the display device is a first mode, and
displaying, by the display device, the display image included in the display signal on the display surface when the operation mode of the display device is a second mode.

10. The display system according to claim 9, wherein the second processor further executes one or more further programs for:
accepting, by the display device, a display setting indicating whether to display the composite image on the display surface or not, and
not displaying the composite image, by the display device, on the display surface even if the display device is in the first mode, when the display setting indicates that the composite image is not to be displayed on the display surface.

11. The display system according to claim 8, wherein the first processor further executes one or more further programs for:
transmitting, by the image supply device, the display signal including the coordinate information representing the position in the display image of the first operation, to the display device, when the first operation and a different operation from the first operation are accepted.

12. The display system according to claim 11, wherein the first processor further executes one or more further programs for:
transmitting, by the image supply device, the display signal including the coordinate information representing a position on the display surface of the first operation, to the display device, when an operation mode of the image supply device is a third mode and the first operation and a second operation that is different from the first operation are accepted, and
transmitting, by the image supply device, the display signal including the coordinate information representing the position on the display surface of the first operation, to the display device, when the operation mode of the image supply device is a fourth mode and the first operation and a third operation that is different from the first operation and the second operation are accepted.

13. A control method for a display system, the method comprising:
displaying, by an image supply device, a display image;
accepting a first operation to the display image;
transmitting a display signal to a display device, the display signal including coordinate information representing a position in the display image of the first operation and the display image;
generating, by the display device, a composite image formed by combining a line drawing image at a position corresponding to the coordinate information;
displaying, by the display device, the composite image on a display surface of the display device;
displaying, by the display device, the composite image generated based on the display image and the coordinate information included in the display signal, on the display surface, when an operation mode of the display device is a first mode;
displaying, by the display device, the display image included in the display signal on the display surface when the operation mode of the display device is a second mode;
accepting, by the display device, a display setting indicating whether to display the composite image on the display surface or not; and
not displaying the composite image, by the display device, on the display surface even if the display device is in the first mode, when the display setting indicates that the composite image is not to be displayed on the display surface.

14. The control method for the display system according to claim 13, further comprising:
accepting, by the image supply device, a transmission setting indicating whether to transmit the coordinate information to the display device or not,
transmitting, by the image supply device, the display signal including the coordinate information to the display device when the transmission setting indicates that the coordinate information is transmitted to the display device, and transmitting, by the image supply device, the display signal that does not include the coordinate information to the display device when the transmission setting indicates that the coordinate information is not transmitted to the display device.

* * * * *